J. W. KOKEMULLER.
Cotton Gin.
No. 67,773.
Patented Aug. 13, 1867.
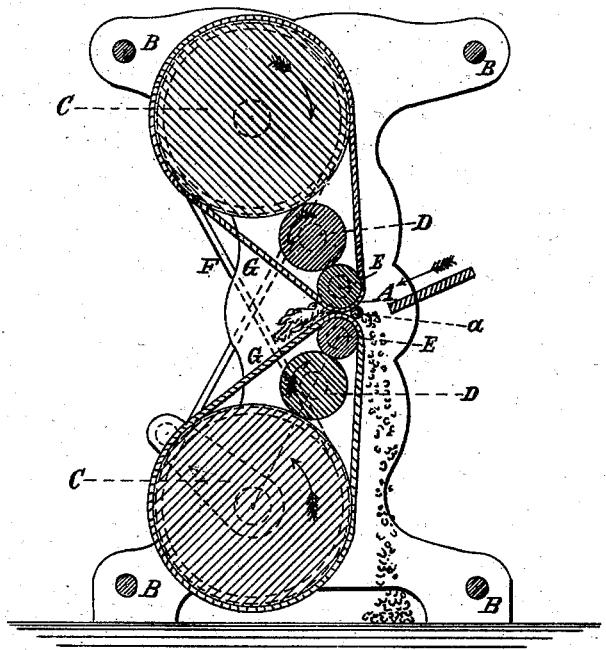

United States Patent Office.

J. W. KOKEMULLER, OF BLUFFTON, SOUTH CAROLINA.

Letters Patent No. 67,773, dated August 13, 1867.

---

IMPROVEMENT IN COTTON-GINS.

---

The Schedule referred to in these Letters Patent and making part of the same.

---

TO ALL WHOM IT MAY CONCERN:

Be it known that I, J. W. KOKEMULLER, of Bluffton, Beaufort district, South Carolina, have invented a new and useful Improvement in Roller Cotton-Gins; and I do hereby declare that the following is a full, clear, and exact description thereof; which will enable others skilled in the art to make and use the same, reference being had to the accompanying drawings, forming part of this specification.

This invention is an improvement on the old roller cotton-gin, and is designed to obviate the difficulty attending the springing of the rollers, a contingency due to the necessarily small diameter of the latter.

This difficulty, exists in connection with that of gearing the rollers, so that they may be rapidly driven under the operation of the old roller-gin, which performs its work perfectly though slowly, and has not as yet been superseded by any gin for thorough work, although other gins have operated more rapidly, but with more or less injury to the stock or fibre.

My improvement admits of the rollers, being rapidly rotated and without the possibility of their springing, and without in the least injuring the fibre or stock.

The accompanying drawing represents a side sectional view of my invention.

The framing of the gin may be composed of two side pieces A A, connected by transverse bars B. C C, D D, and E E are the rollers of the gin, the rollers E E being the ones which perform the work or gin the cotton. C C may be termed the drivers, and D D serve as bearings to prevent the springing of E E, the latter being small in diameter, corresponding to that of the old roller-gin. The driving-rollers C C are connected by a cross-belt, F, and around the upper and lower rollers C E endless belts G G pass, said belts working in contact between the rollers E E. It will be seen from the above description that the rollers E E will be effectually prevented from springing, as the intermediate rollers D D between C and E serve as firm bearings; and it will further be seen that the rollers E, in consequence of being driven by friction from D, in connection with the belts G, may be rapidly rotated without the possibility of being twisted, a contingency of frequent occurrence with the old roller-gin, in consequence of the power being applied at one end of the rollers. The cotton is fed to the "bite" between the belts G G on the ordinary finger or feed-band, a rod or bar being placed in the angle of the "bite" to serve as a stripper to aid in detaching the seed from the cotton, the latter being drawn through between the belts, while the seed drops through the grating or wires at the inner end of the finger or feed-board.

I would remark that the belts G G might be dispensed with, and that in lieu of the rollers D D a series of wheels or shafts might be used, but I think the belts G would be desirable, as they insure a free discharge of the cotton and prevent the wrapping of the same around the rollers E.

What I claim as new, and desire to secure by Letters Patent, is—

1. The driving-rollers C C and working or ginning-rollers E E, in combination with the intermediate rollers D D, or equivalent wheels to serve as bearings for the rollers E, and to transmit power to the same from the driving-rollers C, substantially as and for the purpose specified.

2. In combination with the rollers above specified, the belts G G applied, substantially as and for the purpose set forth.

The above specification of my invention signed by me this 11th day of June, 1867.

J. W. KOKEMULLER.

Witnesses:
ALEX. F. ROBERTS,
H. N. TAFT.